United States Patent [19]

Rice

[11] Patent Number: 5,745,123
[45] Date of Patent: Apr. 28, 1998

[54] METHOD FOR RESIZING AN IMAGE BY A FACTOR OF TWO

[75] Inventor: Daniel S. Rice, Oakland, Calif.

[73] Assignee: Sun Microsystems, Inc., Mountain View, Calif.

[21] Appl. No.: 562,693

[22] Filed: Nov. 27, 1995

[51] Int. Cl.⁶ .................................................. G06F 15/00
[52] U.S. Cl. .................................................. 345/439
[58] Field of Search ..................... 395/139, 135, 395/133, 138; 345/435, 439, 433

[56] References Cited

U.S. PATENT DOCUMENTS

| 5,491,769 | 2/1996 | Moller | 395/139 |
| 5,542,038 | 7/1996 | Schafer | 395/139 |
| 5,577,181 | 11/1996 | Givens et al. | 395/135 |

*Primary Examiner*—Phu K. Nguyen
*Attorney, Agent, or Firm*—Blakely Sokoloff Taylor & Zafman

[57] ABSTRACT

A method for scaling images by a factor of two. Two variables are extracted from an unaligned input stream. The variables are selectively interleaved. The high and low order bytes of the results of the interleaving are multiplied to convert to a 16-bit representation. Horizontally interpolated data is generated by adding pairs of this conversion. The previous iterations of horizontally interpolated data is retained in buffers. Vertically interpolated data is formed by adding current and previous horizontally interpolated data together. The horizontally interpolated data is then doubled to maintain equal precision between the vertically and horizontally interpolated data. A packing function is employed to convert the data back to an eight-bit representation for output to the destination. Because the precision is the same, a single implicit divisor in the packing instruction handles both horizontally and vertically interpolated data.

18 Claims, 10 Drawing Sheets

| $a0$ | | $a0$ | $\frac{a0+a1}{2}$ | $a1$ | $\frac{a1+a2}{2}$ | $a2$ | |
| $a1$ | | $\frac{a0+b0}{2}$ | $\frac{a0+a1+b0+b1}{4}$ | $\frac{a1+b1}{2}$ | $\frac{a1+a2+b1+b2}{4}$ | $\frac{a2+b2}{2}$ | |
| $a2$ | | $b0$ | $\frac{b0+b1}{2}$ | $b1$ | $\frac{b1+b2}{2}$ | $b2$ | |
| $\vdots$ | $\Rightarrow$ | $\frac{b0+c0}{2}$ | $\frac{b0+b1+c0+c1}{4}$ | $\frac{b1+c1}{2}$ | $\frac{b1+b2+c1+c2}{4}$ | $\frac{b2+c2}{2}$ | |
| $b0$ | | $c0$ | $\frac{c0+c1}{2}$ | $c1$ | $\frac{c1+c2}{2}$ | $c2$ | |
| $b1$ | | $\vdots$ | $\vdots$ | $\vdots$ | $\vdots$ | $\vdots$ | |
| $b2$ | | | | | | | |
| $\vdots$ | | | | | | | |
| $c0$ | | | | | | | |
| $c1$ | | | | | | | |
| $c2$ | | | | | | | |
| $\vdots$ | | | | | | | |

FIG. 1A

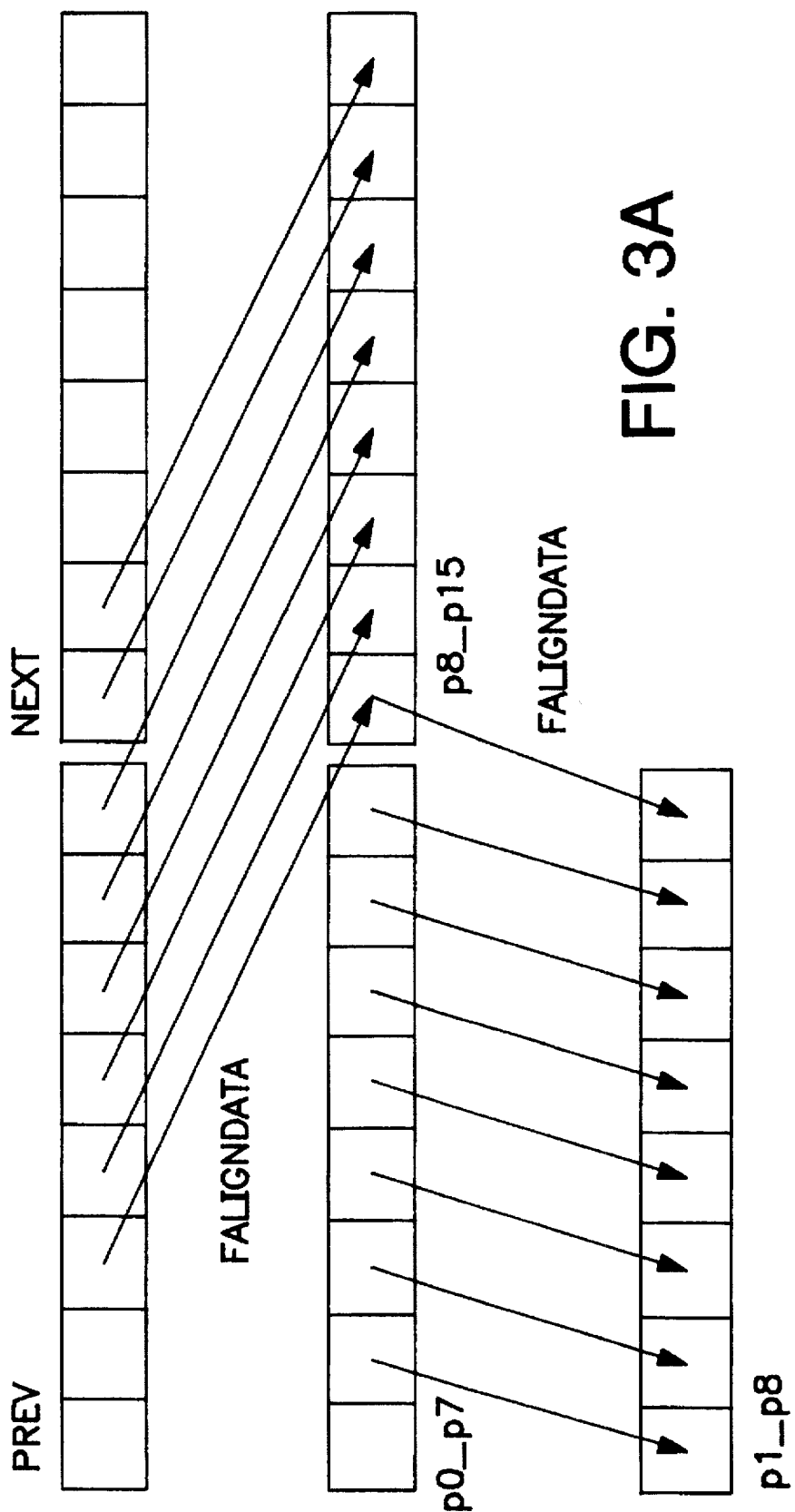

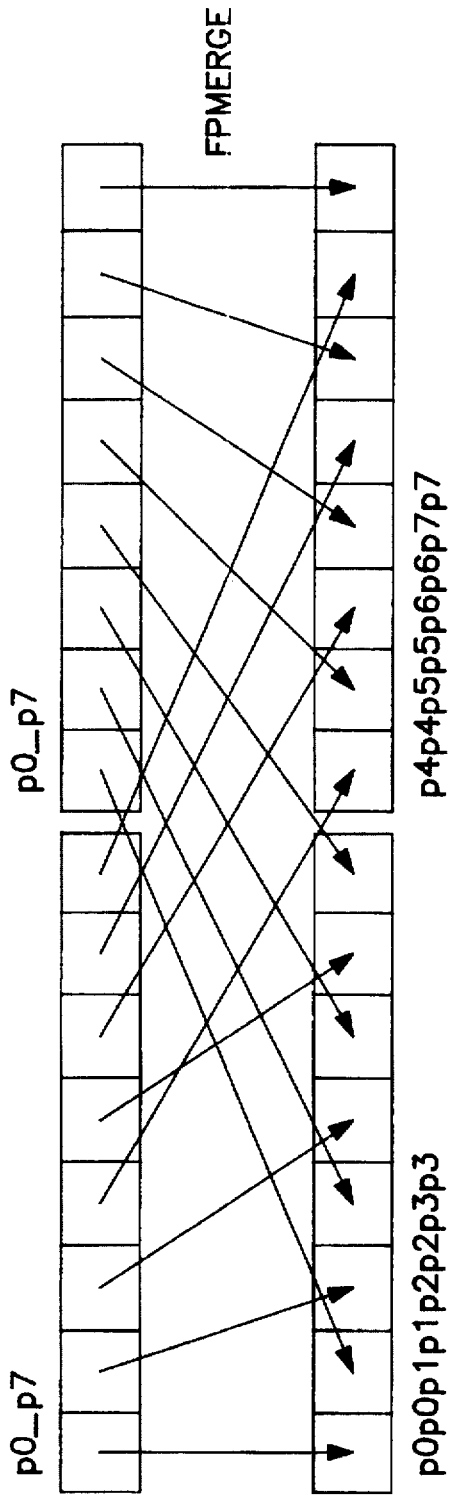
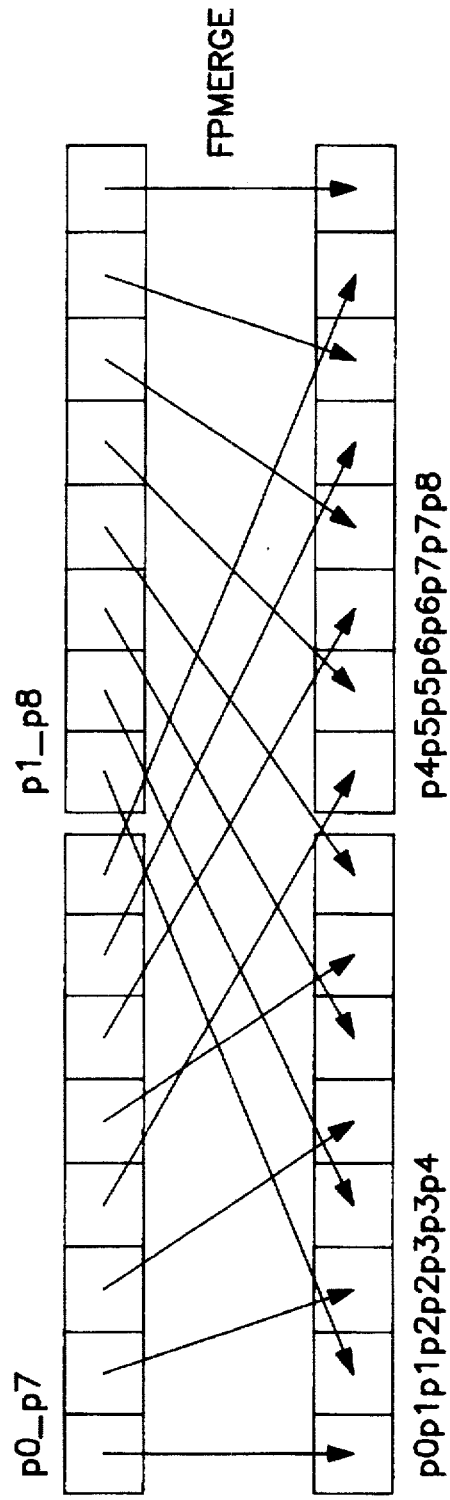
FIG. 3B
FIG. 3C

METHOD FOR RESIZING AN IMAGE BY A FACTOR OF TWO

BACKGROUND OF THE INVENTION (1) Field of the Invention

The invention relates to graphical resizing of images. More specifically, the invention relates to a method for bi-linear scaling of an image to produce a zoom of a source image.

(2) Related Art

Resizing graphical data is generally well known in the art. If images are resized, source pixels provide varying contributions to the destination pixels. This contribution is known as the coefficient contribution of the source pixel. Typically, for cases where there is more than one source pixel contributing, either four or sixteen pixels are deemed to provide the contribution. This corresponds to bi-linear and bi-cubic filtering, respectively. It is generally well-known in the art that scaling can be done separably. For example, a particular image can be scaled first horizontally, and then a horizontally scaled image can be scaled vertically by selecting the appropriate coefficients for the source pixels.

Coefficients are selected by choosing a geometrical point that is the center of the destination pixel and establishing the function that maps the points in the source to the destination, thereby generating a scaled translation of the destination as a linear function of x and y. The inverse of the function yields the point in the source from which the data comes. If the selected point is not the center of a source pixel, it is necessary to interpolate the source data to determine the relative distances between source pixel centers and weight them accordingly. Thus, the filter coefficients are functions of subpixel position of a backward mapped destination point.

There are many cases in which scaling by a factor of two is required. In such cases, bi-linear filtering simplifies the calculation of coefficients of contribution as each adjacent pixel is deemed to provide half of the horizontal interpolate. Similarly, vertical neighbors are each deemed to provide half of the vertical interpolate. The central pixel is derived as one quarter of each contributing source pixel. Unfortunately, the existing scaling procedures fail to avoid slow pixel by pixel manipulation of the image data and fail to achieve the speed and efficiency required in some applications.

It is desirable to be able to efficiently scale by a factor of two. Moreover, it is desirable to be able to operate on multiple pixels simultaneously.

BRIEF SUMMARY OF THE INVENTION

A method for scaling an image by a factor of two is disclosed. For example, in one embodiment, two variables are extracted from an unaligned input stream. An unaligned input stream exists where the first valid datum is not guaranteed to occur at an address that is an even multiple of the number of data simultaneously accessible. Depending on whether the starting pixel is a horizontal interpolate, either the first variable or the second variable is merged with itself. The first and second variables are also merged with each other in either case. Each merge is performed on the high and low order bytes of the respective variables separately. Thus, the merge returns four new variables each containing 8 values each in 8-bit representation.

These four merged variables are each multiplied by a preselected constant to convert to a 16-bit representation. The constant is selected such that subsequent processing will yield an output which does not require additional computation. The multiply has the additional effect of doubling the number of variables from four to eight. Then by adding the eight variables in pairs, horizontally interpolated data is generated.

This horizontally interpolated data is added to corresponding data from the previous horizontally interpolated row which is retained in a buffer. Once the add is complete, the horizontally interpolated data replaces its counterpart in the buffer. The add creates vertically interpolated data. Because the add to the buffered value effectively "doubles" the vertically interpolated data, it is necessary to double the horizontally interpolated data to maintain the relationship between the two. This doubling is performed by adding the horizontally interpolated data to itself.

Both the vertically interpolated data and the horizontally interpolated data must be packed for output to the destination. The packing function provides an implicit divide which can be set by the user. Coordination between the selected constant and the packing function is important for maximum efficiency. Because equal precision between the vertically and horizontally interpolated data has been maintained, a single packing divisor works for both data types. The packing converts from a 16-bit representation to an 8-bit representation, placing the data in the appropriate form for output to the destination raster.

BRIEF DESCRIPTION OF THE DRAWINGS

FIG. 1a shows an arbitrary image scaled by two as in the instant invention.

FIG. 3a shows data extraction as used in the invention.

FIG. 3b shows self-merging a variable as used in the invention.

FIG. 3c shows merging of distinct variables as used in the invention.

DETAILED DESCRIPTION OF THE INVENTION

A method for resizing graphical images in a computer system is disclosed. In the following description, for purposes of explanation, specific applications, numbers, and configurations are set forth in order to provide a full understanding of the present invention. However, it will be apparent to one skilled in the art that the present invention may be practiced without the specific details. In other instances, well-known systems are shown in diagrammatical or block diagram form so as not to obscure the present invention unnecessarily.

Figure 1B:
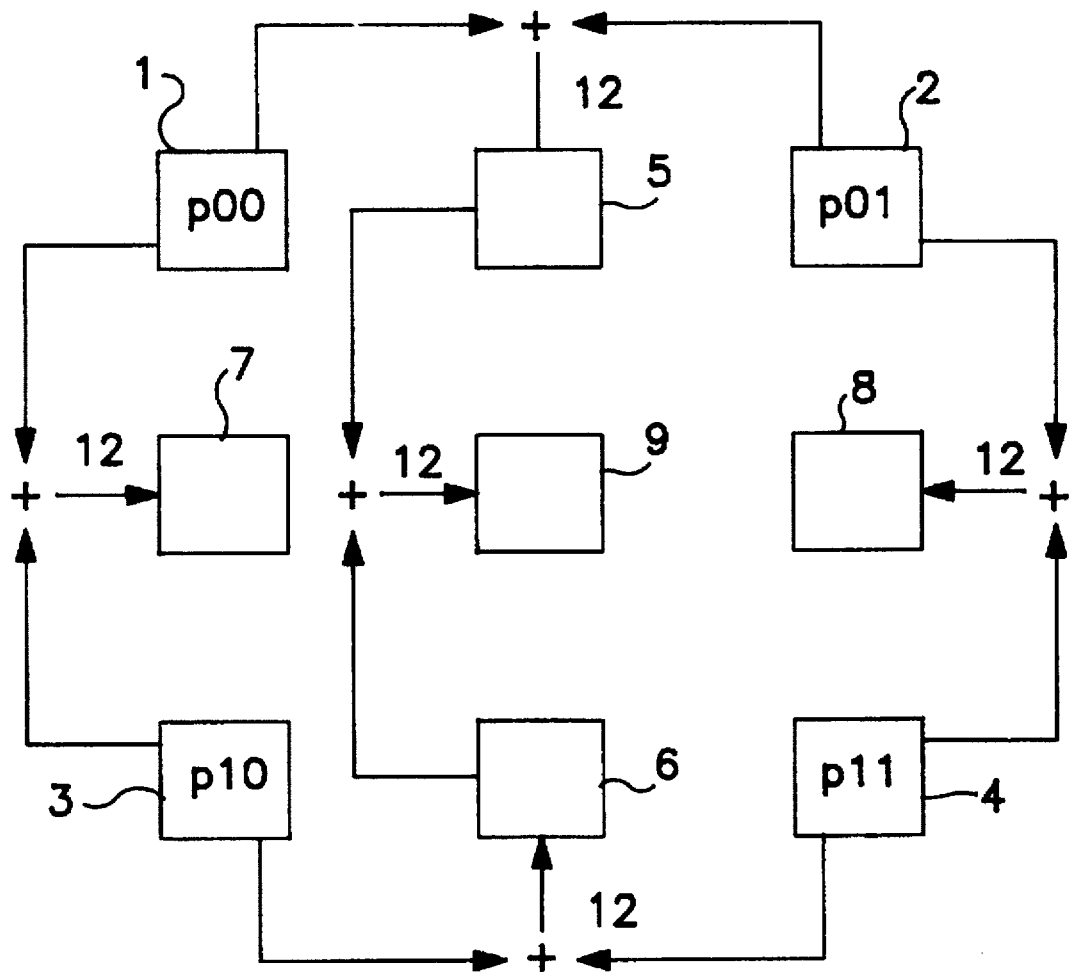
FIG. 1b shows the scaling of a 2×2 pixel block as in the instant invention.

The problem basically stated is how to take arbitrary image data and scale it by a factor of two. FIG. 1a shows algebraically an example of scaling such arbitrary image data using the instant invention where each of a0, a1, . . . , b0, b1, . . . , c0, c1, . . . represent a pixel data of a source image. FIG. 1b graphically illustrates a scaling of a 2×2 pixel block using the instant invention. Horizontal adjacent pixels 1, 2, and 3 are added together and divided by two to generate horizontal interpolates 5, 6. Similarly, vertical neighbors 1, 3, and 2, 4 in the source image are added together and divided by two to generate vertical interpolates 7, 8. The horizontal interpolates 5, 6 can then be added together and divided by two to yield a central interpolate 9. It will be recognized by one of ordinary skill in the art that summing the vertical interpolates 7, 8 and dividing by two would yield the same result. To efficiently achieve the desired scaling, the method of the invention manipulates the pixel data using new hardware primitives to allow increased parallelism in computation while efficiently creating variables which can be added together to generate the needed interpolates.

The process is complicated somewhat because the method must accommodate a starting pixel of the forms p0 or p0+p1/2 or p0+q0/2 or p0+p1+q0+q1/2. It is necessary to maintain twin main loops to accommodate both initial pure pixels and horizontal interpolates. Handling of a first vertical interpolate is accommodated by placement of the output pointer in the special case of the first scanline.

Figure 1C:
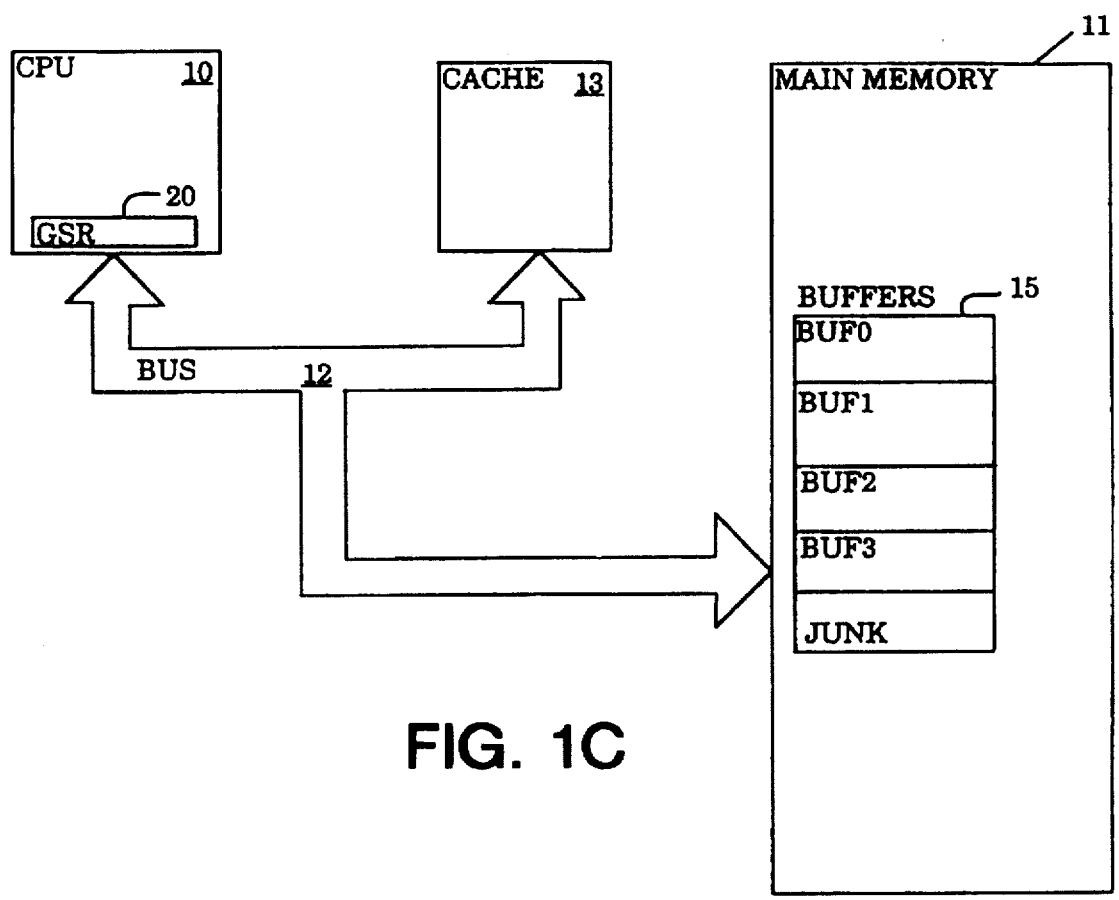
FIG. 1c shows a block diagram of a computer system of the invention.

FIG. 1c shows a system on which may employ the method of the invention. Processor (CPU) 10 is coupled to main memory 11 and a cache 13 by a bus 12. A control register 20 in the processor 10 is used to store a value which determines what portion of two operands will be returned responsive to an align instruction, described more fully below. In an ULTRASPARC® workstation, this control register 20 is known as the Graphics Status Register ("GSR"). Other architecture may denote this control register 20 differently. Buffers 15 are shown allocated in main memory 11. The buffers BUF0–BUF3 are used in the resizing to store horizontally interpolated data from a prior row. The JUNK buffer is used to provide a safe location for writing unwanted output data. Both buffers' uses are explained more fully below.

Throughout this specification, instructions from the ULTRASPARC® visual instruction set ("VIS") are described and employed. In one exemplary embodiment the CPU 10 is the ULTRASPARC® of Sun Microsystems which employs the visual instruction set ("VIS"). ULTRASPARC® and VIS are discussed more fully in the copending application titled A CENTRAL PROCESSING UNIT WITH INTEGRATED GRAPHIC FUNCTIONS, Ser. No. 08/236,572, filed Apr. 29, 1995. It is anticipated that other instruction sets and architectures will support the same functionalities. Accordingly, the functionalities however denoted are envisioned as within the scope and contemplation of the invention.

Figure 2A:
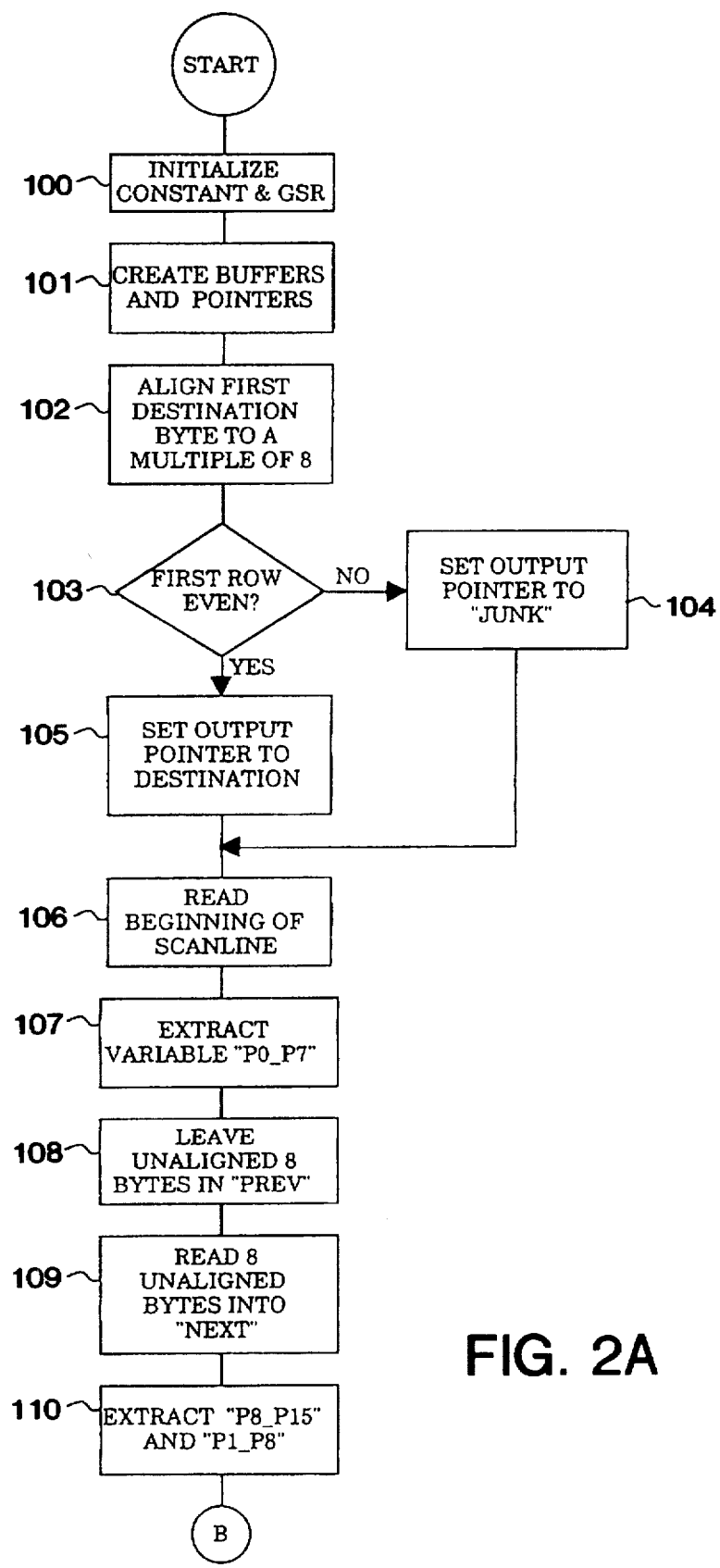
FIG. 2a is a flowchart of a portion of one embodiment of the invention.
Figure 2B:
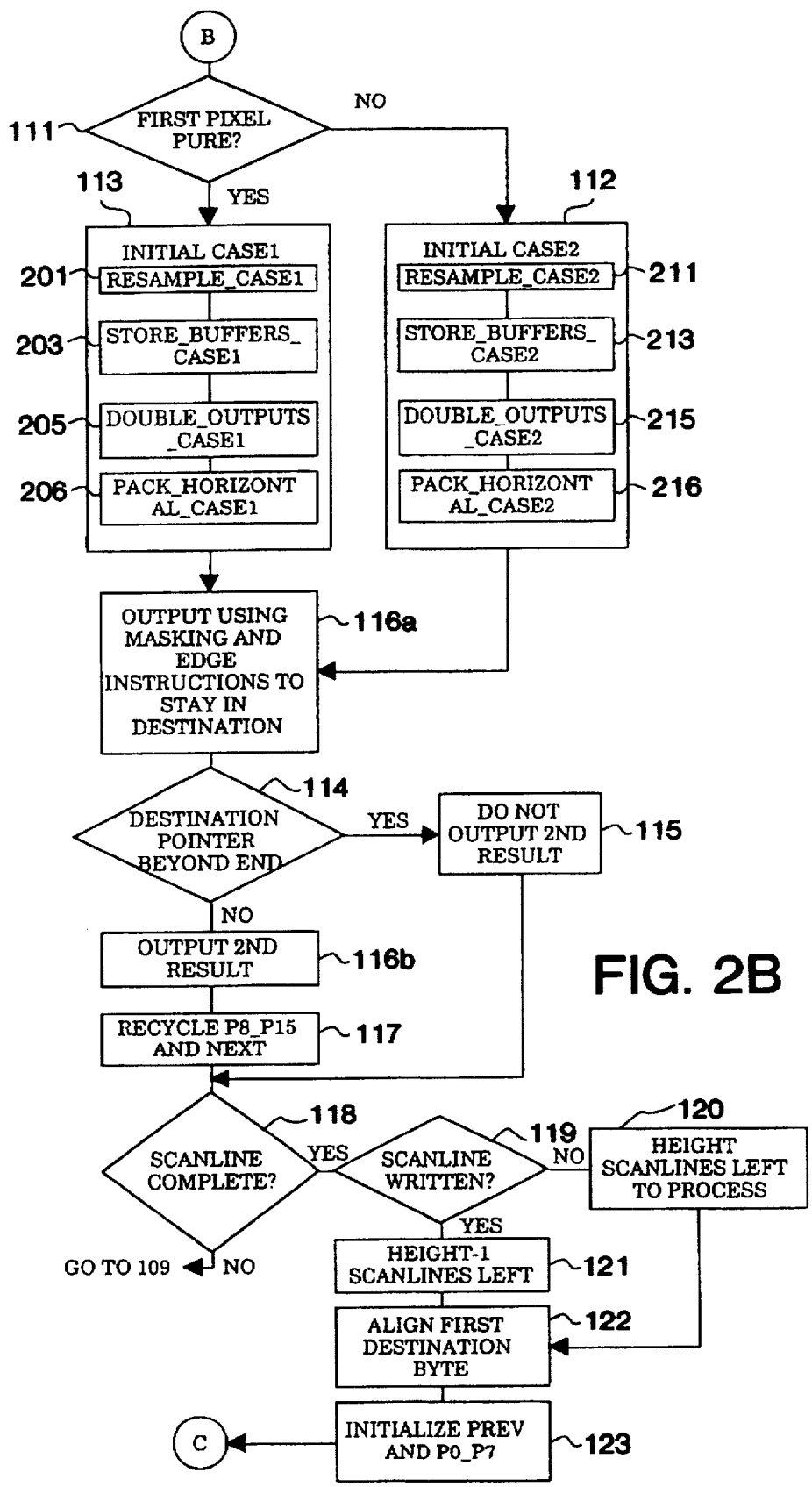
FIG. 2b is a flowchart of a second portion of one embodiment of the invention.
Figure 2C:
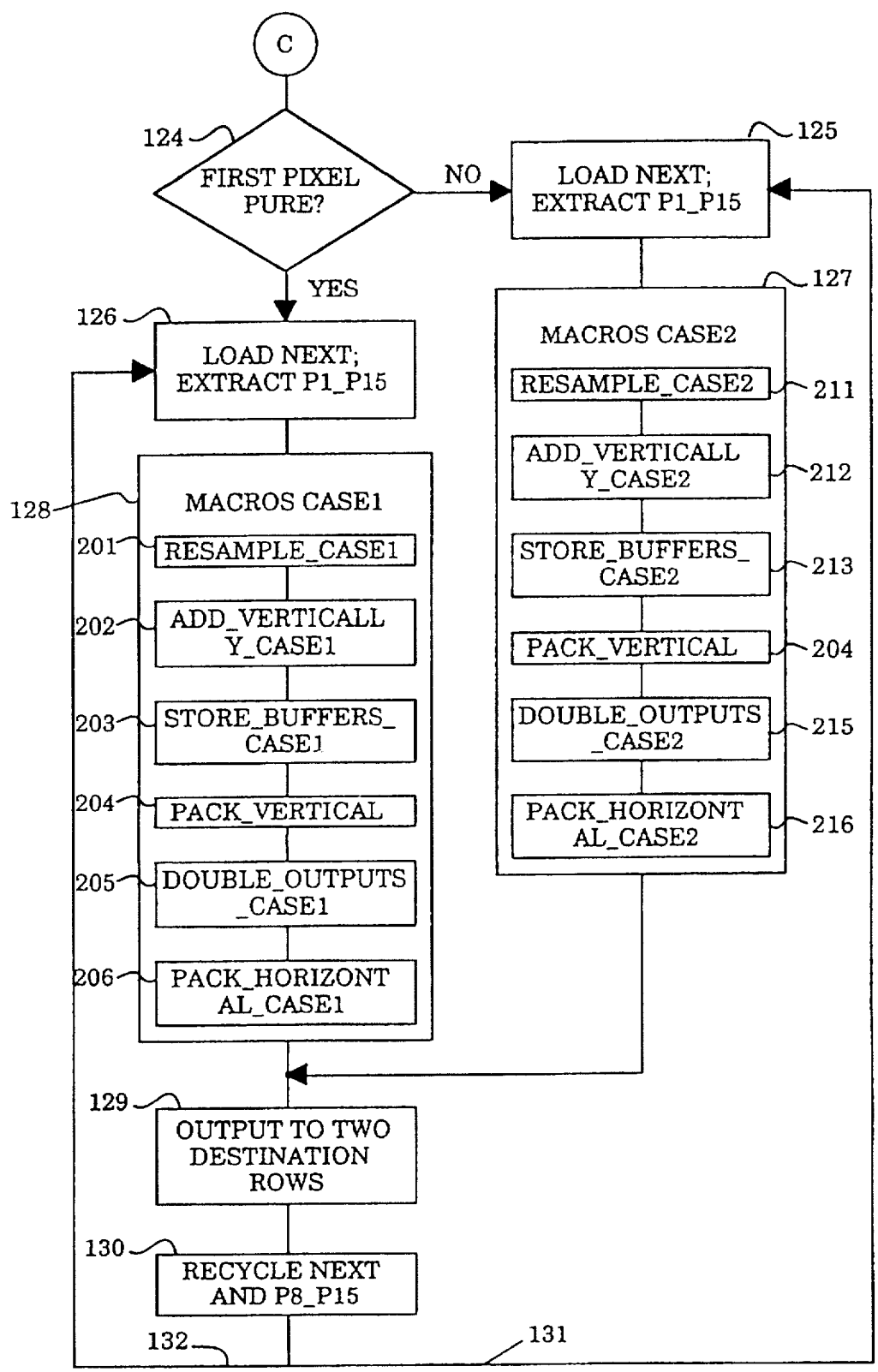
FIG. 2c is a flowchart of the main loops of one embodiment of the invention.

FIGS. 2a–c show an overview flow diagram for one embodiment of the instant invention. FIG. 1a shows the initialization of the system and the beginning of the special case of the first scanline. Functional block 100 corresponds to the initialization of a constant with which incoming pixel values will be multiplied to convert to 16-bit values. By appropriately selecting the constant, the end result is correctly scaled. In one exemplary embodiment, the constant 8,192 is used. This corresponds to a five place shift. The pack instruction, discussed more fully below, allows the specification of the number of places shifted in conjunction with the packing. With a constant equal to 8192, a seven place shift in the packing process effects the desired result. Other constants could equally be used, however, in selecting a constant, it is important to keep in mind a necessity to have sufficient bits to represent any resulting fractional pixel values so that resolution is not lost.

The GSR is also initialized using the alignaddr instruction at functional block 100. The setting of the GSR dictates how many bytes each of two consecutive 8-byte operands will contribute to the result of an faligndata instruction. For example, alignaddr (0,5) sets the GSR align bits to 5, subsequent use of the faligndata instruction on two consecutive 8-byte values r and s, faligndata (r,s) yields $r_{5-7}\ s_{0-4}$. The faligndata instruction is used extensively in acquiring appropriately aligned data from an unaligned input stream.

Five buffers and corresponding pointers are created at functional block 101. The first four buffers will be used to store intermediate results for use in vertical interpolation. The fifth buffer, "junk," is a safe location to write unwanted output data. Each buffer should be twice the length of a source scanline.

Because the invention is designed to write to the destination eight bytes at a time, it is necessary to align the destination so that the first destination byte lies in an address which is a multiple of eight. In one embodiment, C code is used to produce values until the first destination byte lies at such an address. Functional block 102 corresponds to this alignment. Decision block 103 corresponds to the determination of whether the first row in the destination is an even row, thereby corresponding to horizontal interpolates, or an odd row, thereby requiring vertical interpolation. In either case, the first scanline represents a special case because the buffers are without valid data. Therefore, values must be generated to fill the buffers for the first time without using any buffered values. Because no buffered values are available, it is not possible to generate vertical interpolates, therefore, functional block 104 corresponds to setting the output pointer to junk to prevent the writing of invalid data into the destination location. However, where the first destination row is even, horizontal interpolates can be generated without the use of buffered data. Therefore, functional block 105 corresponds to setting the same output pointer to the destination address.

At functional block 106, the beginning of the scanline is read. The variable p0_p7 is extracted at functional block 107. At functional block 108, eight unaligned bytes from the scanline are left in the intermediate variable "PREV," while the next eight unaligned bytes are read into the intermediate variable "NEXT." From the PREV and NEXT variables, the variable p8_p15 is extracted at functional block 110. p8_p15 is used as an faligndata operand with p0_p7 to extract the variable p1_p8. FIG. 3a graphically illustrates acquisition and extraction of the variables required for horizontal interpolation in the instant invention. Two 8-byte variables p0_p7 and p8_p15 are required from an aligned memory using faligndata and intermediate variables previous and next. The variable p0_p7 will be used directly, while the second variable for direct use, p1_p8 can be procured using faligndata in conjunction with the variables, p0_p7 and p8_p15 as shown.

FIG. 2b completes the special case. At decision block 111, a determination is made whether the first pixel to be output to the destination is a pure pixel or an interpolate, i.e. is the first pixel of the form p0 or p0+p1/2. Depending on the result of this determination, closely related macros of functional block from 113 or 112, respectively, will be applied.

Functional block 113 contains the macros for use in the initial scanline first pixel pure special case. Functional block 112 contains the macros for use in the initial scanline first pixel horizontal interpolate case. These macros will be discussed in detail in connection with the general case below. Significantly, the vertical macros are absent from the initial case because, as noted above, the buffers contain no valid data. Thus, no vertical interpolation is possible in the initial case.

Masking and edge instructions are used to write a first eight byte result to the destination raster at functional block 116a. It is also necessary to be sure that the destination pointer does not go beyond a destination end as such could result in an overwrite of other needed data. Since the pointer is incremented after each write, functional block 115 suppresses second write of each pass if the test fails. Decision block 114 corresponds to this check. When the test does not fail, a second 8-byte result is written to the destination at functional block 116b. Masking and edge instructions are again employed. Functional block 117 corresponds to recycling of variable p8_p15 and next. At this functional block, p8_p15 becomes p0_p7 and NEXT becomes PREV for the next iteration. At decision block 118, a determination is made whether this scanline is complete. If the scanline is not complete, eight more unaligned bytes are read into NEXT and processing continues at functional block 109. Once the scanline is complete, the special case of the first scanline gives way to the more general case. An initial determination of whether a scanline was actually written to the destination register is made at decision box 119. If no scanline was written, the previous line was sent to junk because the first pixel is a vertical interpolate. The result of decision box 119 indicates whether H or H-1 scanlines remain to be processed at functional blocks 120 and 121, respectively. H is the height of the destination. If an odd number of scanlines remain to be processed in the final iteration, the second output row must be suppressed by directing the corresponding pointer to junk. The destination is then aligned in functional block 122 as it was in functional block 102. Similarly, in functional block 123, PREV and the variable p0_p7 are initialized as in special case functional blocks 107 and 108.

FIG. 2c shows the main loops of the general case from which substantial efficiencies of the invention are derived. Decision block 124 is really an implicit decision as the purity of the first pixel will be dictated in the special case of the first scanline. In the pure pixel case, NEXT will be loaded and p1_p8 will be extracted in functional block 126. This extraction is followed by execution of the CASE1 macros in functional block 128. Functional block 128 contains the macros for the general pure pixel case.

The macro RESAMPLE_CASE1 shown in subblock 201 is pivotal to the invention. In RESAMPLE_CASE1 201, p0_p7 is merged with itself. The fpmerge instruction of VIS takes two 4-byte operands and interleaves them to create a single 8-byte result. Thus, p0_p7, when merged with itself, is merged in two separate instructions with identical high order bytes and identical low order bytes being merged together. This creates the variables p0p0p1p1p2p2p3p3, and p4p4p5p5p6p6p7p7. FIG. 3b shows this merging graphically. FIG. 3c shows the second step of RESAMPLE_CASE1 201 which is to merge the variable p0_p7 with the variable p1_p8. Similar to the case discussed above, the result is the variables p0p1p1p2p2p3p3p4 and p4p5p5p6p6p7p7p8.

Figure 3D:
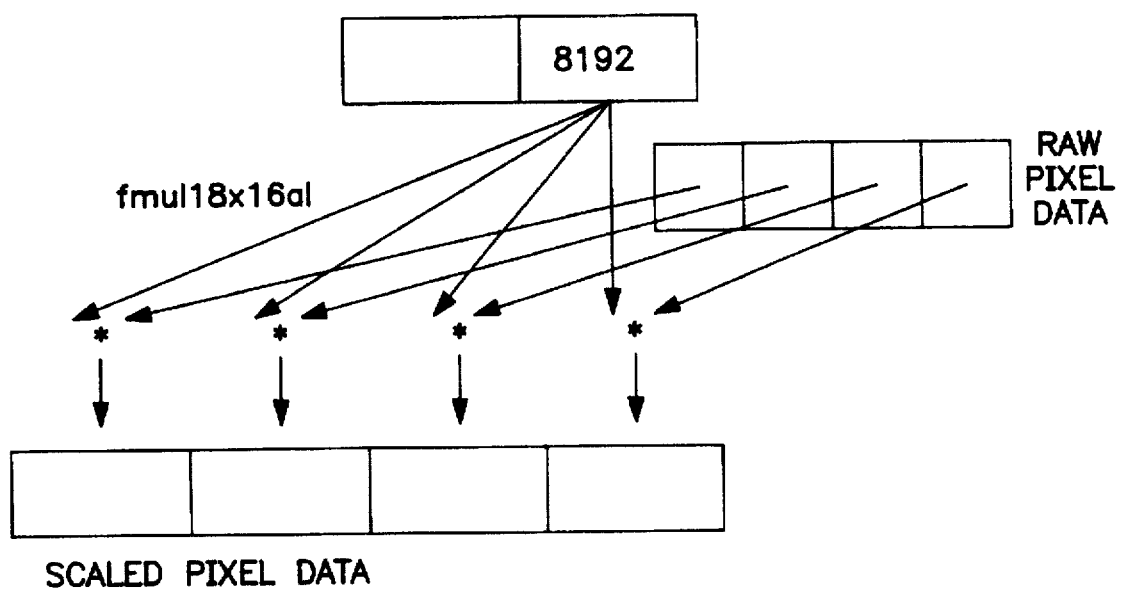
FIG. 3d shows multiplication to convert from 8 to 16-bit representations as used in the invention.

These variables are converted to a 16-bit representation by multiplying by the preselected constant as shown in FIG. 3d. In an alternate embodiment, this conversion could equally be to 32-bit or any representation which provides sufficient bits that subsequent adds do not result in an overflow. The multiplication is performed on high and low order bytes of the four variables. The result is eight variables, p0p0p1p1_2; p0p1p1p2_2; p2p2p3p3_2; p2p3p3p4_2; p4p4p5p5_2; p4p5p5p6_2; p6p6p7p7_2; and p6p7p7p8_2 which are then added together in pairs to yield the four variables p0_p0p1_p1_p1p2; p2_p2p3_p3_p3p4; p4_p4p5_p5_p5p6, and p6_p6p7_p7_p7p8. For example, the variable p0_p0p1_p1_p1p2 contains in 16 bit form the values 2*p0, (p0+p1), 2*p1, (p1+p2).

Figure 4A:
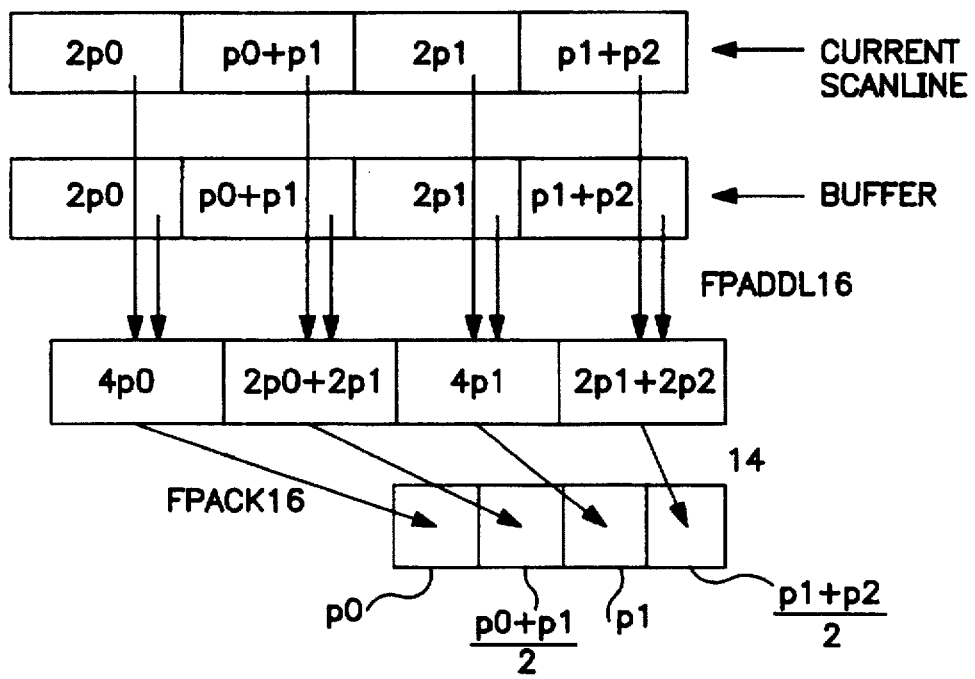
FIG. 4a shows doubling and packing horizontally interpolated data of the instant invention.
Figure 4B:
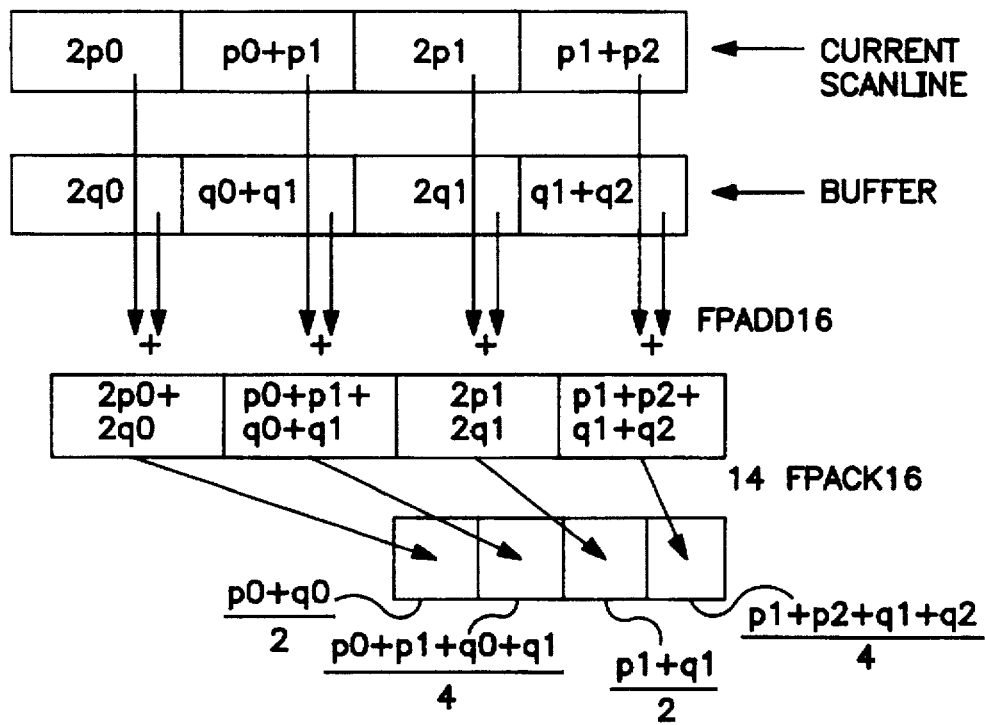
FIG. 4b shows the vertical add and vertical packing of the instant invention.

The next macro in functional block 126 is ADD_VERTICALLY_CASE1 which creates the vertically interpolated rows by adding the contents of buffers containing the previous horizontally interpolated row with corresponding, i.e. vertically adjacent, values from the current horizontally interpolated row. The store of buffers in macro 203 then replaces the previous contents of the buffers with the current values of the horizontally interpolated row. A vertical pack macro 204 which is shared between case 1 and case 2 employs the fpack instruction to convert the results of the vertical add to eight bit representation output values. The function of the vertical add coupled to the pack vertical is shown in FIG. 4b. The fpack function implicitly divides by four to yield the correct vertically interpolated output values.

Because the even rows are not subjected to the ADD_VERTICAL_CASE macro, and it is relatively expensive to change the implicit divisor of the fpack function, it is desirable to double the horizontally interpolated rows so that division by four will yield the correct results in the horizontally interpolated rows as well. This function is performed by the macro DOUBLE_OUTPUTS_CASE1 in which the even row variables are added to themselves. PACK_HORIZONTAL_CASE1 206 is used to convert the horizontally interpolated rows to eight bit representations with an implicit divisor of 4. The doubling of the even outputs and the packing of the horizontal rows is shown in FIG. 4a. Each iteration of either the CASE1 loop 132 or the CASE2 loop 130 generates two destination rows. Sixteen bytes of each destination row will be generated on each pass through the loop. These bytes will be output at functional block 128. NEXT and p8_15 are then recycled in functional block 129. CASE1 loop 131 or the corresponding CASE2 loop 130 will repeat until the data output of the destination is within 16 bytes of the end of the destination. Because the length of the destination can be determined and a conservative number of iterations performed, there is no need for an explicit conditional in these main loops. Very efficient parallel operations are therefore possible. Once results are being written within 16 bytes of the destination's end, a final clean-up pass is performed using masking as was used in the special case of the first scanline. The clean-up pass is otherwise identical to the corresponding main loop.

If the first pixel is a horizontal interpolate, NEXT is loaded and p1_p8 is extracted, in functional block 125, and the CASE2 macros are executed in functional block 127. Functional block 127 contains the case 2 macros. These macros differ from their counterparts in case 1 only in that the initial inputs to RESAMPLE_CASE2 211 are merged such that p0_p7 and p1_p8 are merged to form the initial variables, and p1_p8 is merged with itself to form the following set of variables. This change ripples through ADD_VERTICALLY_CASE2 212, store buffers CASE2 213, DOUBLE_OUTPUTS_CASE2 215, and PACK_HORIZONTAL_CASE2 216. The CASE2 macros are otherwise in all ways analogous to their counterparts. If the first pixel is pure, the CASE2 loop 131 will be ignored entirely.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of scaling an image by two in a computer system comprising the steps of:
   a) selectively merging either a first variable or a second variable with itself to create at least one merged variable;
   b) merging the first and the second variable to create at least another merged variable;
   c) multiplying the at least one merged variable and the at least another merged variables each by a preselected constant to convert to a plurality of expanded variables in an expanded representation; and
   d) adding the plurality of expanded variables in pairs to generate a horizontally interpolated data.

2. The method of claim 1 further comprising the step of:
   e) adding the horizontally interpolated data to a corresponding horizontally interpolated data from a previous scanline to generate a vertically interpolated data.

3. The method of claim 2 further comprising the step of:
   f) doubling the horizontally interpolated data.

4. The method of claim 3 further comprising the steps of:
   g) packing the doubled horizontally interpolated data;
   h) packing the vertically interpolated data; and
   i) writing the packed vertically interpolated data and the packed horizontally interpolated data to successive rows of a destination.

5. The method of claim 1 wherein the step of selectively merging comprises:
   identifying if a first output pixel is a pure pixel or a horizontal interpolate;
   if the first output pixel is a pure pixel merging the first variable with itself; and
   if the first pixel is a horizontal interpolate merging the second variable with itself.

6. The method of claim 1 wherein the steps of selectively merging and merging comprise:
   interleaving high order bytes of respective variables; and
   interleaving low order bytes of respective variables.

7. The method of claim 1 wherein the constant is 8192.

8. The method of claim 1 further comprising the step of:
   acquiring the first and second variable from an unaligned input stream.

9. The method of claim 8 wherein the step of acquiring comprises the steps of:
   setting a register to determine a contribution of a first and a second unaligned value; and
   taking a first contribution and a second contribution to form the first variable.

10. The method of claim 9 wherein the step of acquiring further comprises the steps of:
    placing the second unaligned value at a predetermined location;
    retrieving a next unaligned value from the input stream;
    taking the first contribution from the second unaligned value and the second contribution from the next unaligned value to form a next first variable; and
    combining a seven byte contribution from the first variable and a one byte contribution from the next first variable to form the second variable.

11. The method of claim 4 further comprising the step of:
    repeating steps a)–i) wherein the input image is a scaled version of an original source image thereby allowing the scaled image diplayed to be scaled by a predetermined even value.

12. A computer program product which includes a computer usable medium having a computer usable code embedded therein for causing an image to be scaled in a computer system having a processor coupled to a memory by a bus, the computer program product comprising:
    computer readable program code device configured to selectively merge either a first variable or a second variable with itself to create at least one merged variable;
    computer readable program code device configured to merge the first and the second variable to create at least another merged variable;
    computer readable program code device configured to multiply the at least one and at least another merged variables each by a preselected constant to convert to a plurality of expanded variables in an expanded representation; and
    computer readable program code device configured to add the plurality of expanded variables in pairs to generate a horizontally interpolated data.

13. The computer program product of claim 12 further comprising:
    a computer readable program code device configured to add the horizontally interpolated data to a corresponding horizontally interpolated data from a previous scan line to generate a vertically interpolated data.

14. The computer program product of claim 13 further comprising:
    a computer readable program code device configured to double the horizontally interpolated data.

15. The computer program product of claim 14 further comprising:
    a computer readable program code device configured to pack the doubled horizontally interpolated data.

16. The computer program product of claim 12 further comprising:
    a computer readable program code device configured to pack the vertically interpolated data.

17. The computer program product of claim 12 wherein the computer readable program code devices configured to merge and selectively merge; (i) interleave high order bytes of respective variables and (ii) interleave low order bytes of respective variables.

18. The computer program product of claim 12 further comprising:
    a computer readable program code device configured to acquire the first and second variable from an unaligned input stream.

* * * * *